(12) United States Patent
Sullam et al.

(10) Patent No.: US 8,598,908 B1
(45) Date of Patent: Dec. 3, 2013

(54) BUILT IN SYSTEM BUS INTERFACE FOR RANDOM ACCESS TO PROGRAMMABLE LOGIC REGISTERS

(75) Inventors: Bert Sullam, Bellevue, WA (US); Warren Snyder, Snohomish, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 367 days.

(21) Appl. No.: 12/772,948

(22) Filed: May 3, 2010

Related U.S. Application Data (60) Provisional application No. 61/174,543, filed on May 1, 2009, provisional application No. 61/175,080, filed on May 4, 2009.

(51) Int. Cl.
*H01L 25/00* (2006.01)

(52) U.S. Cl.
USPC ........... 326/41; 326/47; 365/156; 365/189.08

(58) Field of Classification Search
USPC ............ 326/37–41, 47; 365/154, 156, 189.08
See application file for complete search history.

(56) References Cited

U.S. PATENT DOCUMENTS

| | | | |
|---|---|---|---|
| 7,343,483 B1 * | 3/2008 | May et al. | 713/1 |
| 7,375,549 B1 * | 5/2008 | Tang et al. | 326/38 |
| 7,525,343 B1 * | 4/2009 | Neuendorffer et al. | 326/40 |
| 8,125,243 B1 * | 2/2012 | Wright | 326/41 |
| 2005/0278551 A1 * | 12/2005 | Goodnow et al. | 713/193 |
| 2006/0255832 A1 * | 11/2006 | Speers et al. | 326/39 |
| 2011/0199117 A1 * | 8/2011 | Hutchings et al. | 326/38 |

* cited by examiner

*Primary Examiner* — Jason M Crawford (57) ABSTRACT

A method and apparatus to provide random access to a programmable logic register. A processing device in a programmable logic system retrieves data from a memory of the programmable logic system. The data is loaded into a configuration register configured to store configuration data for a programmable logic function over a system bus. The processing device programs a programmable logic block to implement the programmable logic function based on the configuration data, where the processing device is configured to access a first configuration register in the configuration register set, the first configuration register corresponding to a first programmable logic block in the programmable logic system, without affecting a second configuration register corresponding to a second programmable logic block.

20 Claims, 6 Drawing Sheets

BUILT IN SYSTEM BUS INTERFACE FOR RANDOM ACCESS TO PROGRAMMABLE LOGIC REGISTERS

RELATED APPLICATIONS

This application claims the benefit of U.S. Provisional Application No. 61/174,543 filed on May 1, 2009 and U.S. Provisional Application No. 61/175,080 filed on May 4, 2009.

TECHNICAL FIELD

This disclosure relates to the field of implementing programmable logic devices and, in particular, to providing random access to programmable logic registers.

BACKGROUND

A programmable logic device (PLD) is an electronic component used to build reconfigurable digital circuits. Unlike a logic gate which has a fixed function, a PLD has an undefined function at the time of manufacture. The PLD is programmed, or configured, with a specific function before it is used in an electronic circuit.

The arrangement and operation of components within the PLD are programmed by architecture configuration bits. The architecture configuration bits are set prior to normal operation of the PLD. The bits are set using an operation called "programming" or "configuration." The configuration bits can be stored in volatile memory (i.e., SRAM), non-volatile memory (i.e., EEPROM/flash) or received from either a serial or parallel external data stream. When the configuration bits are stored in volatile memory, the configuration bits need to be loaded from a non-volatile memory, a micro controller, or some other source.

There are two types of registers in a programmable logic system: configuration registers (or other memory element) and application registers. The configuration registers are set to map digital functions into the programmable logic (for example to determine the logic equations for the function). After the configuration of the programmable logic system is complete, the function may start operation. In certain arrangements, the configuration bits for the PLD are generated off-chip by a user with a configuration tool. At the time of configuration, the configuration bits are loaded into the system from the external configuration tool and stored configuration memory cells (e.g., a configuration register). Such a configuration process determines the time required to program the PLD, since the configuration process must be implemented every time the PLD is either turned on or configured. The configuration process is "write-only" from the user's perspective and the configuration data must be in a specific format to program the device due to the fact that this data is programmed in a fixed (normally serial) sequence internally. In addition, the entire chip system implementing the PLD must be stopped and re-booted to accept the new configuration data. In this configuration process, the entire chip functionality must be reprogrammed in this sequence, even if only a small or modular change is desired. Once the device is configured, the digital logic functions can be operational. In many cases, these logic functions have application registers. The application registers are registers that the user interacts with to control the function and to pass data to and from the function. The interface to these registers, that is the method to write and read these application registers, is also created out of the programmable resources and therefore is included in the configuration described previously.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to provide fast and flexible configuration of programmable logic in a system on a chip, and by the same mechanism provide a highly efficient method of accessing application registers that are mapped into the programmable logic. A built-in system bus interface allows a microcontroller or other processing device to both configure and interface with functions mapped into a programmable logic array. In one embodiment, data is retrieved from a system memory. The data is loaded over the built-in system bus into a configuration register that stores configuration data for a programmable logic function. The built-in system bus allows random access with read/write capability to the data stored in the configuration register. The processing device programs or configures a programmable logic block to implement the programmable logic function based on the data in the configuration register. The processing device is configured to access a first configuration register in the configuration register set, the first configuration register corresponding to a first programmable logic block in the programmable logic system, without affecting a second configuration register corresponding to a second programmable logic block. Once configured, the processing device can also use the capability of the built-in system bus to read and write the application registers in the programmable logic.

Figure 1:
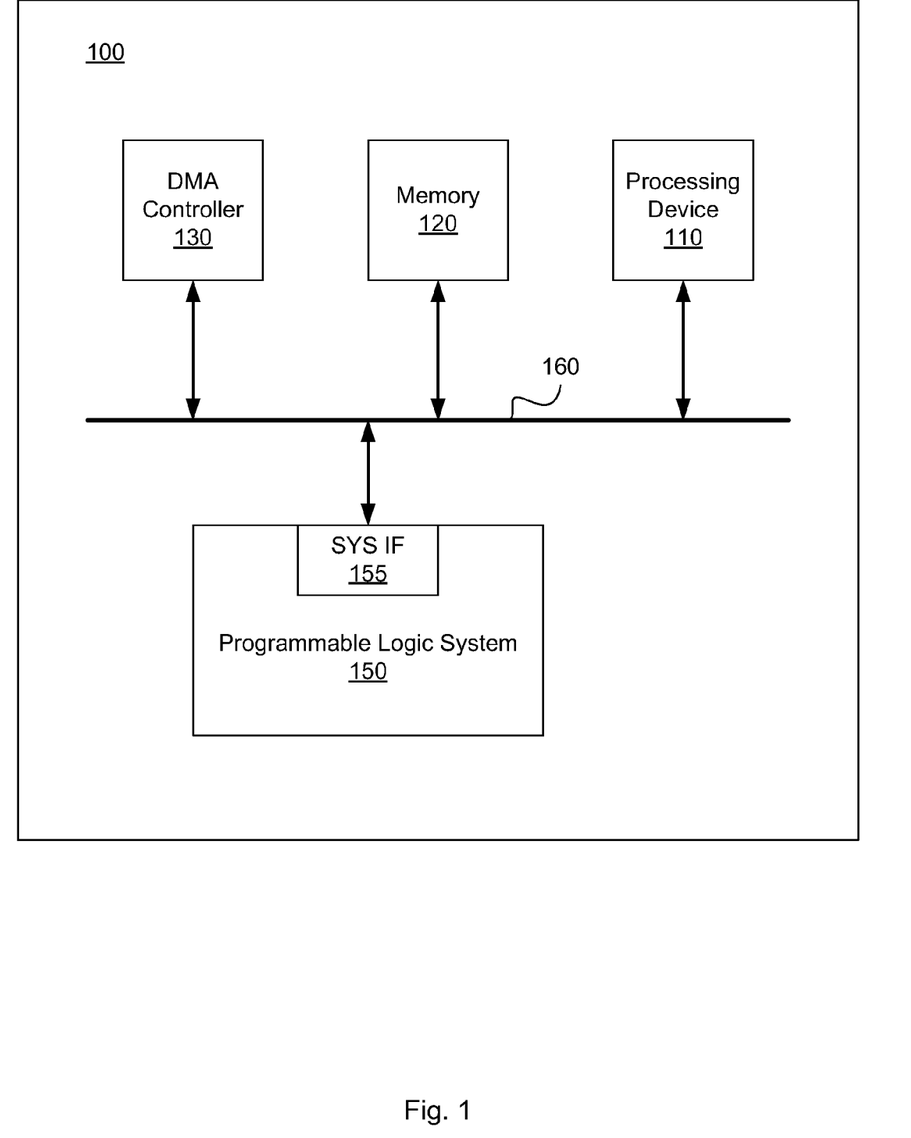
FIG. 1 is a block diagram illustrating a processing system having a programmable logic system with a built-in system bus according to an embodiment.

FIG. 1 is a block diagram illustrating a processing system having a programmable logic system with a built-in system bus according to an embodiment of the present invention. In one embodiment, the system 100 includes a processing device 110, memory 120, direct memory access (DMA) controller 130 and programmable logic system 150. All blocks in system 100 may be connected through built-in system bus 160. In one exemplary embodiment, processing system 100 may be a Programmable System on a Chip (PSoC™) processing device, manufactured by Cypress Semiconductor Corporation, San Jose, Calif. One embodiment of a core architecture of processing system 100 is discussed below with respect to FIG. 6. Processing device 110 may include one or more general-purpose processing devices such as a microprocessor or central processing unit, a controller, or the like. Alternatively, processing device 110 may include one or more special-purpose processing devices such as a digital signal processor (DSP), an application specific integrated circuit (ASIC), a field programmable gate array (FPGA), or the like. In an alternative embodiment, for example, processing device 110 may be a network processor having multiple processors including a core unit and multiple microengines. Additionally, processing device 110 may include any combination of general-purpose processing devices and special-purpose processing devices.

Memory 120 is configured to configuration bits or configuration data for implementing a programmable logic function in programmable logic block 150. In certain embodiments, memory 120 may include, but is not limited to, read-only memory (ROM), random-access memory (RAM), erasable programmable memory (e.g., EPROM and EEPROM), flash memory, or another type of medium suitable for storing electronic instructions. In other embodiments, memory 120 may be a removable storage medium such as a magnetic storage medium (e.g., floppy diskette), an optical storage medium (e.g., CD-ROM), or a magneto-optical storage medium.

In one embodiment, DMA controller 130 may be used to transfer data from memory 120 to programmable registers 140 without using CPU resources. While processing device 110 may initiate the DMA transfer, the transfer is actually executed by DMA controller 130. This allows processing device 110 to remain available to perform other tasks during the transfer.

Programmable logic system 150 may include one or more programmable logic blocks (e.g., PLDs) and programmable routing. Programmable logic system 150 may include one or more registers or other data storage elements. In certain embodiments, one or more configuration registers may store configuration data for implementing a programmable logic function in one of the programmable logic blocks. Programmable logic system 150 may also include system interface block 155. System interface block 155 may enable communication between programmable logic system 150 and built-in system bus 160. System interface block 155 decodes an address associated with data being sent over built-in system bus 160 to determine where data is being written from or read to and then drives data to that address location or reads data from the address location. System interface block 155 may be a fixed block attached to each component of programmable logic system 150 preventing the need to create an interface using programmable elements. Additional details regarding the programmable registers and programmable logic blocks of programmable logic system 150 will be provided below with respect to FIGS. 2 and 3.

Each of the components in processing system 100, including processing device 110, memory 120, DMA controller 130 and programmable logic system 150 are interconnected through built-in system bus 160. Built-in system bus 160 may be a built-in system bus interface to route data signals between the blocks of programmable logic system 100. Built-in system bus 160 may have a bit width of N-bits to provide parallel access to programmable registers 140 and programmable logic 150. N may be an integer, such as for example, 8, 16 or 32 bits. Built-in system bus 160 may be built-in, thus not using a portion of the programmable logic which can otherwise be used to implement other logic functions. Any of the signals provided by built-in system bus 160 may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Figure 2:
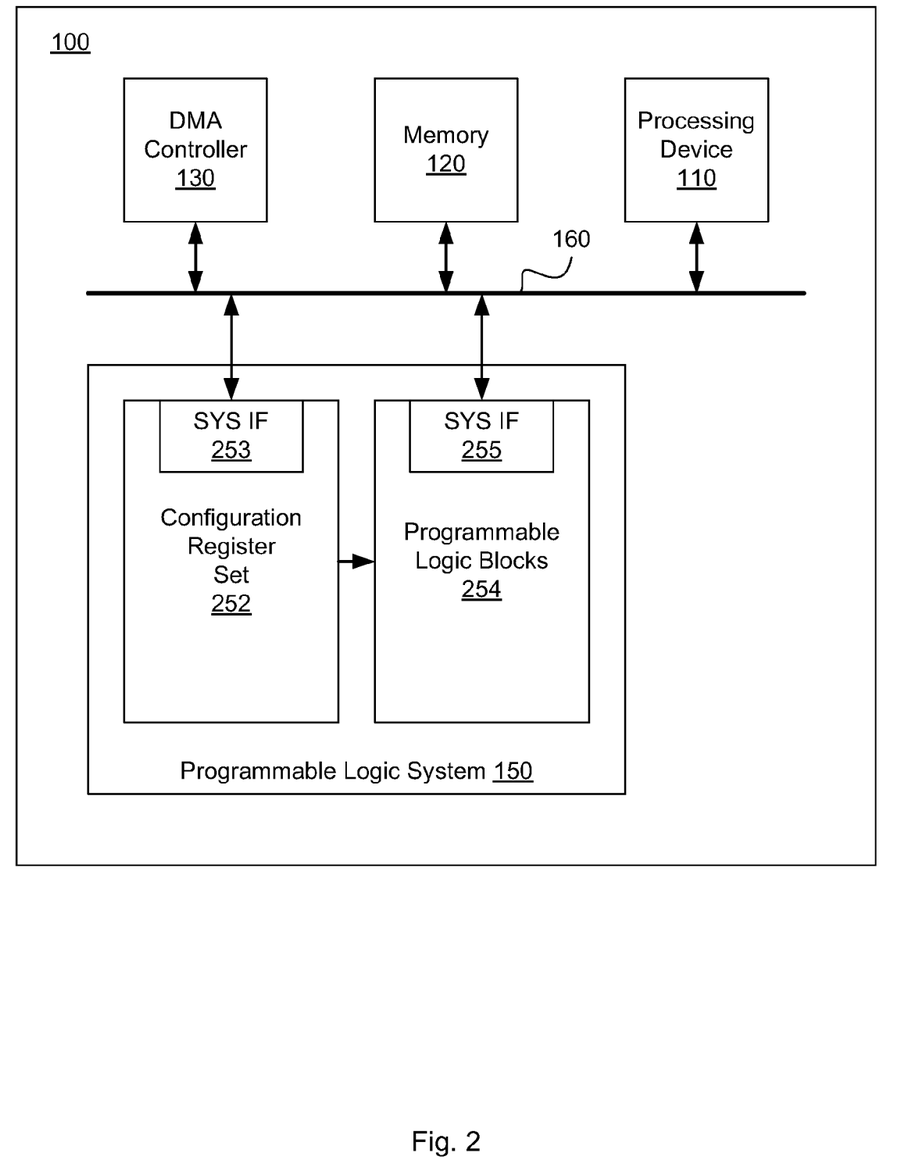
FIG. 2 is a block diagram illustrating a processing system with programmable registers according to an embodiment.

FIG. 2 is a block diagram illustrating a processing system with programmable registers according to an embodiment of the present invention. Programmable logic system 150 of processing system 100 may include configuration register set 252 and programmable logic blocks 254. Configuration register set 252 may be configured to store configuration data for programmable logic functions to be implemented in programmable logic blocks 254. The configuration data may cause devices programmable logic blocks 254 to perform the logic function. For example, the configuration data may cause a functional block such as a timer to be implemented in programmable logic blocks 254. The configuration data may be in any of a number of known PLD programming languages, such as programmable array logic assembler (PALASM), advanced Boolean expression language (ABEL), Verilog or very-high-speed integrated circuit hardware description language (VHDL). Configuration register set 252 is directly accessible via built-in system bus 160 through system interface block 253. Memory 120, which is coupled to configuration register set 252 over built-in system bus 160, may be programmed with configuration data for implementing any number of possible logic functions. According to an algorithm or input received by programmable logic system 100, processing device 110 or DMA controller 130 may load configuration data for a specific logic function from memory 120 into configuration register set 252 over built-in system bus 160. The data stored in configuration register set 252 causes the particular logic function to be implemented in programmable logic blocks 254 which are also accessible via built-in system bus 160 through system interface block 255. Programmable processing system 100 may include any number of configuration registers depending on the number and size of programmable logic devices in programmable logic blocks 254.

Figure 3:
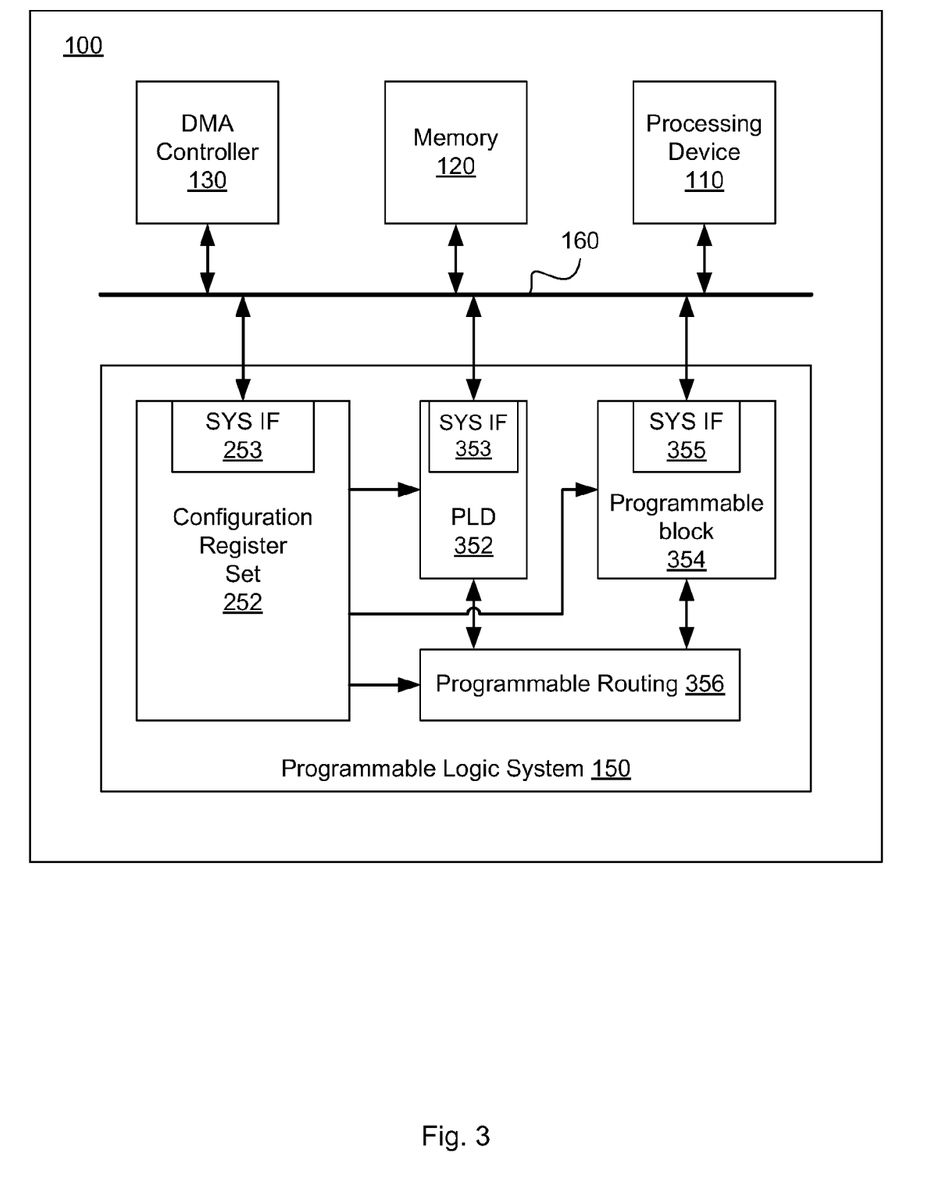
FIG. 3 is a block diagram illustrating a processing system with programmable logic devices according to an embodiment.

FIG. 3 is a block diagram illustrating a processing system with programmable logic devices according to an embodiment of the present invention. Programmable logic system 150 of processing system 100 may include a plurality of programmable logic blocks, such as PLD 352 or other programmable blocks 354 and programmable routing block 356. Programmable logic devices (PLD) 352 may be an electronic component used to build reconfigurable digital circuits. PLD 352 and programmable block 354 may generally have an undefined function, but are programmed, or configured, with a specific function before being used in an electronic circuit. Each of PLD 352 and PLD 354 may have a built-in system interface block 353, 355 to enable access to the blocks via built-in system bus 160. Programmable block 354 may be any of several known types of programmable devices, such as programmable array logic (PAL), generic array logic (GAL), complex programmable logic devices (CPLDs), or field-programmable gate arrays (FPGAs). Although two programmable blocks 352, 354 are illustrated in FIG. 3, in other embodiments, programmable logic system 150 may include any number of programmable blocks.

In certain embodiments, PLD 352 and programmable block 354 may have application memory cells embedded within the logic. The memory cells may be, for example, an application register configured to store user data for programmable logic functions implemented in programmable logic blocks. The application register is also accessible through built-in system bus 160 and receives input from a user through a communication interface (not shown). In the example described above, where a timer is implemented in programmable logic system 150 based on the configuration data stored in configuration register set 252, the user data stored in the application register could be for example, a time out value for the timer.

Figure 4:
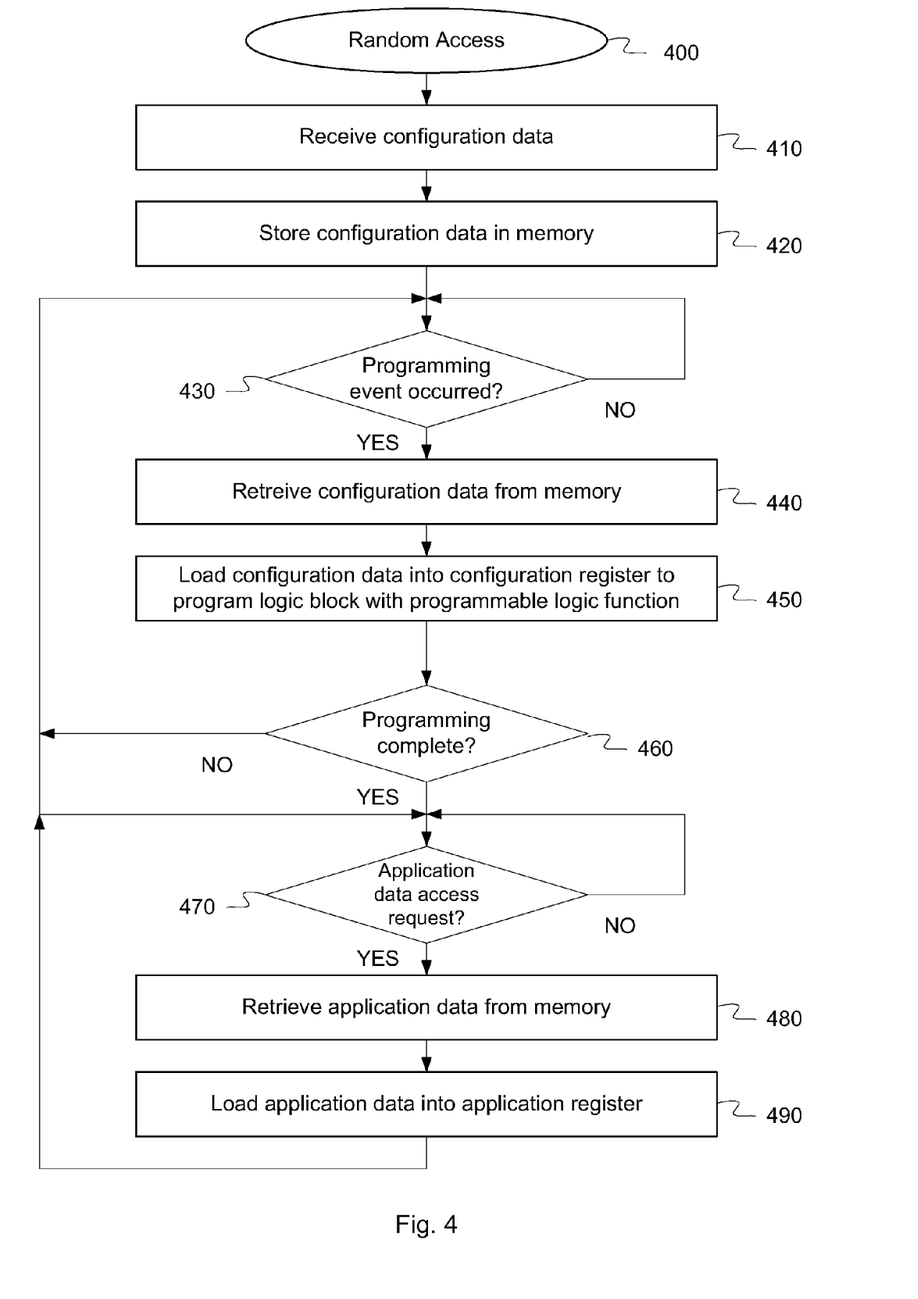
FIG. 4 is a flowchart illustrating a method of operating a processing system with a built-in system bus for random access to programmable logic registers according to an embodiment.

Programmable routing block 356 is coupled to built-in system bus 160 and to each of programmable blocks 352, 354, which are in turn coupled to built-in system bus 160, as well. Programmable routing 356 may be formed from the same or similar logic devices as programmable blocks 352, 354 and provides an interconnection between the programmable blocks 352, 354. For example, a certain logic function implemented by PLD 352 may depend on the output of another function implemented by programmable block 354. Programmable routing block 356 may be programmed by configuration data stored in configuration register set 252 to provide the interconnection as needed. As shown in FIG. 4, each component of the programmable logic system has a connection to the built-in system bus 160 and is accessible by the processing device 110 in random access fashion, just like other peripherals or memory blocks in the system.

FIG. 4 is a flowchart illustrating a method of operating a processing system with a built-in system bus for random access to programmable logic registers according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 400 is performed by processing system 100 of FIG. 1.

In one embodiment, at block 410, method 400 receives configuration data loaded into the system from an external configuration tool. The configuration data may be received by programmable logic system 100 at a communications interface (not shown) connected to built-in system bus 160. The configuration data may include programming data for a number of logic functions that may be implemented in programmable logic system 150. At block 420, method 400 stores the received configuration data in memory 120. In one embodiment, memory 120 may be a flash memory connected to built-in system bus 160.

At block 430, method 400 determines whether a programming event has occurred. A programming event may be any event, in response to which, the processing device 110 causes programmable logic 150 to be programmed according to the configuration data stored in memory 120. The event at block 430 may be, for example, the initial configuration of the programmable logic after a device reset, or subsequently a specific instruction in a software program running on processing device 110 which identifies a logic function to be implemented at a particular time, a hardware based trigger, such as a signal received on an input/output pin of system 100 or the pressing of a button or other form of user input, or the expiration of an internal timer or counter. The occurrence of an event may cause a signal to be sent to processing device 110 indicating what function to implement.

Once a programming event is detected at block 430, at block 440, method 400 retrieves the configuration data from memory and at block 450, loads the configuration data into configuration register set 252. The signal created in response to the event at block 430 may indicate a particular logic function to be implemented. Processing device 110 retrieves the corresponding configuration data for the logic function from memory 120 and loads the data into an available space in configuration register set 252 to program the logic block with the programmable logic function. In other embodiments, DMA controller 130 may automatically transfer the data from memory 120 to configuration register set 252 without processor interference. There may be one or more configuration registers corresponding to each programmable logic device in programmable logic system 150.

At block 460, method 400 determines whether programming of programmable logic system 150 is complete. If not, method 400 returns to block 430 to wait for another programming event. If programming is complete, method 400 proceeds to block 470. At block 470, method 400 determines whether an application data access request has been received. In one embodiment, an application data access request includes user input of application data to control the programmable logic function. The application data received from the user may be stored in memory 120.

Once a an application data request is detected at block 470, at block 480, method 400 retrieves the application data from memory 120 and at block 490, loads the application data into the application register in programmable logic system 150.

Upon occurrence of another programming event at block 430, the operations at blocks 440-490 may be repeated for a new programmable logic function. Because each of the programmable blocks 352, 354, as well as configuration register 242 are directly coupled via built-in system bus 160, programmable logic system 100 can program PLD 352 while another programmable block 354 is performing its specified function. In additional, any portion of PLD 352 may be reprogrammed without affecting the rest of PLD 352 because each byte of configuration data is individually addressable over built-in system bus 160. Additionally, a PLD may be reprogrammed with a new function, for which configuration data is stored in memory 120, without rebooting programmable logic system 100 or otherwise interfering with operations of the system. Upon occurrence of another application data access request at block 470, the operations at blocks 480 and 490 may be repeated for the new application data.

Figure 5:
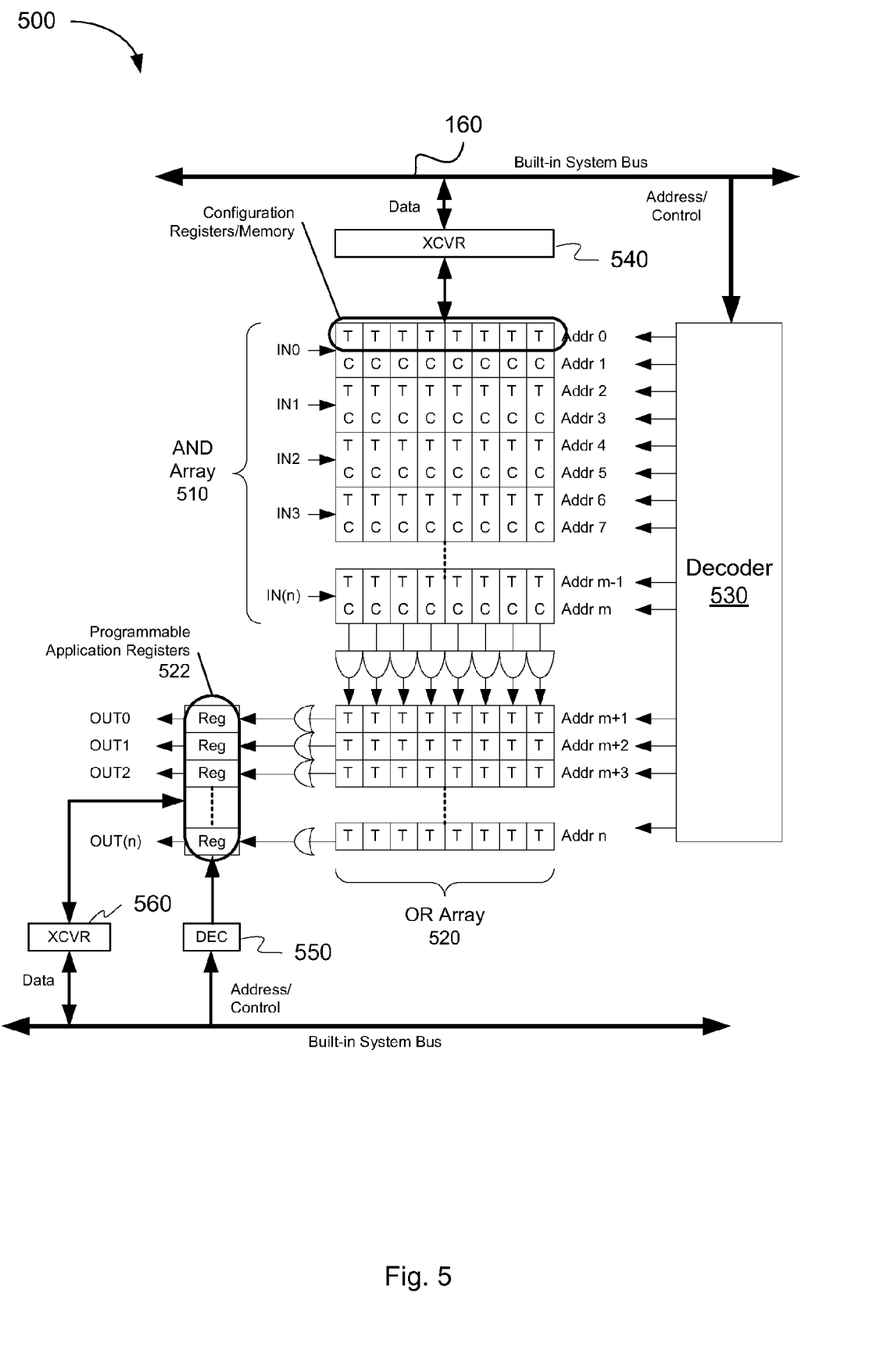
FIG. 5 is a block diagram illustrating a programmable logic device accessible by a built-in system bus according to an embodiment.

FIG. 5 is a block diagram illustrating a programmable logic device (PLD) accessible by a built-in system bus according to an embodiment of the present invention. PLD 500 may be any one of the programmable blocks in programmable logic system 150, such as for example, PLD 352. In one embodiment, PLD 500 includes an AND array 510 and an OR array 520. Each of these arrays contains memory bits to program them. Logic equations are specified as sum-of-products (SOP), where certain inputs (or the inverse of the input) are ANDed together, and then those AND terms are subsequently ORed together to create an output. The output may be controlled by application data stored in programmable application registers 522. Programmable application registers 522 may be accessed by an address decoded in decoder 550 and data may be driven into application registers 522 at the decoded address through transceiver 560. Each AND term has a T or C programming bit for each input. The T stands for true polarity of the input and C stands for complement polarity of the input. A configuration memory bit may be used to selected between true and complement polarity. These bits are organized as bytes and words that can be individually addressed by the built-in system bus 160. Address data on built-in system bus 160 may be fed into decoder 530 where the specific byte being targeted is identified. In this way, PLD 500 may be programmed (i.e., loading configuration data into AND array 510 through transceiver 540) without disturbing other programmable blocks in programmable logic system 150. In one embodiment, decoder 530 and transceiver 540 make up system interface block 253, as described above with respect to FIG. 2. Additionally, one of the output logic expressions (e.g., OUT(n)) in PLD 500 may be changed without disturbing the other output logic expressions in the same PLD.

Figure 6:
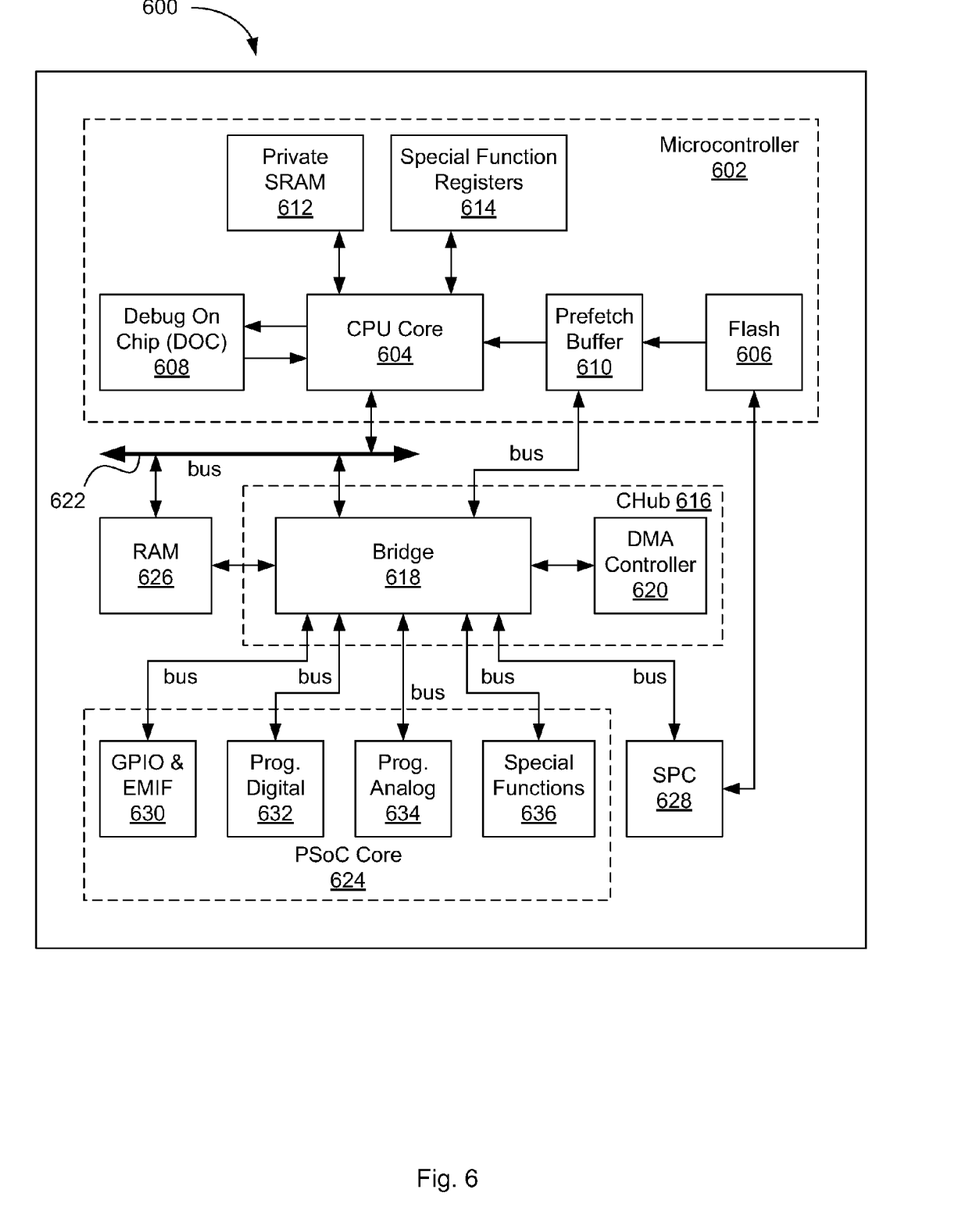
FIG. 6 is a block diagram illustrating a processing device architecture, according to an embodiment.

FIG. 6 illustrates an embodiment of a core architecture 600 of a Programmable System-on-Chip (PSoC®), such as that used in the PSoC3® family of products offered by Cypress Semiconductor Corporation (San Jose, Calif.). In one embodiment, the core architecture 600 may represent processing system 100 as discussed above. In one embodiment, the core architecture 600 includes a microcontroller 602. The microcontroller 602 includes a CPU (central processing unit) core 604, flash program storage 606, DOC (debug on chip) 608, a prefetch buffer 610, a private SRAM (static random access memory) 612, and special functions registers 614. In an embodiment, the DOC 608, prefetch buffer 610, private SRAM 612, and special function registers 614 are coupled to the CPU core 604, while the flash program storage 606 is coupled to the prefetch buffer 610.

The core architecture 600 may also include a CHub (core hub) 616, including a bridge 618 and a DMA (direct memory access) controller 620, that is coupled to the microcontroller 602 via bus 622. Bus 622 may be for example, built-in system bus 160, as described above. The CHub 616 may provide the primary data and control interface between the microcontroller 602 and its peripherals and memory, and a programmable core 624. The DMA controller 620 may be programmed to transfer data between system elements without burdening the CPU core 604. In various embodiments, each of these subcomponents of the microcontroller 602 and CHub 616 may be different with each choice or type of CPU core 604. The Chub 616 may also be coupled to shared SRAM 626 and an SPC (system performance controller) 628. The private SRAM 612 is independent of the shared SRAM 626 that is accessed by the microcontroller 602 through the bridge 618. The CPU core 604 accesses the private SRAM 612 without going through the bridge 618, thus allowing local register and RAM accesses to occur simultaneously with DMA access to shared SRAM 626. Although labeled here as SRAM, these memory modules may be any suitable type of a wide variety of (volatile or non-volatile) memory or data storage modules in various other embodiments.

In various embodiments, the programmable core 624 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 624 includes a GPIO (general purpose IO) and EMIF (extended memory interface) block 630 to provide a mechanism to extend the external off-chip access of the microcontroller 602, a programmable digital block 632, a programmable analog block 634, and a special functions block 636, each configured to implement one or more of the subcomponent functions. In various embodiments, the special functions block 636 may include dedicated (non-programmable) functional blocks and/or include one or more interfaces to dedicated functional blocks, such as USB, a crystal oscillator drive, JTAG, and the like.

The programmable digital block 632 may include a digital logic array including an array of digital logic blocks and associated routing. In one embodiment, the digital block architecture is comprised of UDBs (universal digital blocks). For example, each UDB may include an ALU together with CPLD functionality. In one embodiment, programmable digital block 632 may include programmable logic system 150 as described above.

In various embodiments, one or more UDBs of the programmable digital block 632 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 604) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4x oversampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 634 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 634 may support various analog functions including, but not limited to, analog routing, LCD drive IO support, capacitive sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

Embodiments of the present invention include various operations described herein. These operations may be performed by hardware components, software, firmware, or a combination thereof. Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer).

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A processing system, comprising:
a memory coupled to a system bus;
a configuration register set coupled to the system bus, the configuration register set to store configuration data for a programmable logic function;
a processing device coupled to the system bus, the processing device to retrieve the configuration data from the memory and load the configuration data into the configuration register set over the system bus, wherein each unit of configuration data in the configuration register set is individually addressable over the system bus; and
a programmable logic system coupled to the system bus, the programmable logic system comprising a plurality of programmable logic blocks to implement the programmable logic function based on the configuration data, wherein the processing device to access a first configuration register in the configuration register set to program a first programmable logic block of the plurality of programmable logic blocks using configuration data from the first configuration register, without affecting a configuration of a second programmable logic block of the plurality of programmable logic blocks, wherein the programmable logic system comprises a sum of products array.

2. The processing system of claim 1, further comprising:
an application register coupled to the system bus, wherein the application register is embedded in the programmable logic system and is configured to store application data for the programmable logic function.

3. The processing system of claim 1, wherein the configuration register set comprises a system interface, the system interface comprising a decoder module and transceiver module, wherein the configuration register set is configured to provide random access to the configuration data, and wherein each of a plurality of address locations in the configuration register are individually accessible through the system interface.

4. The processing system of claim 1, wherein the programmable logic system further comprises a programmable routing block.

5. The processing system of claim 1, wherein the processing device is configured to reprogram the first programmable logic block of the plurality of programmable logic blocks without affecting the second programmable logic block of the plurality of programmable logic blocks.

6. The processing system of claim 1, wherein the processing device is configured to reprogram a portion of the first programmable logic block of the plurality of programmable logic blocks without affecting a remainder of the first programmable logic block.

7. The processing system of claim 1, wherein the processing device is configured to determine whether a programming event has occurred, wherein the programmable logic block is programmed by loading the configuration data into the configuration register set in response to the programming event.

8. The processing system of 7, wherein the programming event comprises one of a software instruction trigger, a hardware based trigger, and the expiration of an internal timer.

9. The processing system of claim 1, wherein the memory comprises a flash memory, and wherein the system bus comprises a built-in system bus.

10. A method, comprising:
retrieving, by a processing device, data from a memory of a processing system; and
loading the data into a configuration register set over a system bus, the configuration register set configured to store configuration data for a programmable logic function, wherein a programmable logic system comprises a plurality of programmable logic blocks to implement the programmable logic function based on the configuration data, and wherein the processing device is configured to access a first configuration register in the configuration register set to program a first programmable logic block of the plurality of logic blocks using configuration data from the first configuration register, without affecting a configuration of a second programmable logic block of the plurality of programmable logic blocks, wherein each unit of configuration data in the configuration register set is individually addressable over the system bus, and
wherein the programmable logic system comprises a sum of products array.

11. The method of claim 10, further comprising:
operating the programmable logic system using values stored in an application register coupled to the system bus, the application register configured to store application data for the programmable logic function.

12. The method of claim 10, wherein the configuration register set is configured to provide random access to the configuration data, wherein each of a plurality of address locations in the configuration register are individually accessible.

13. The method of claim 10, wherein the programmable logic system further comprises a programmable routing block, and wherein the system bus comprises a built-in system bus.

14. The method of claim 10, further comprising:
reprogramming the first programmable logic block of the plurality of programmable logic blocks without affecting the second programmable logic block of the plurality of programmable logic blocks.

15. The method of claim 10, further comprising:
reprogramming a portion of the first programmable logic block of the plurality of programmable logic blocks without affecting a remainder of the first programmable logic block.

16. The method of claim 10, further comprising:
determining whether a programming event has occurred, wherein the programmable logic block is programmed in response to the programming event.

17. The method of claim 16, wherein the programming event comprises one of a software instruction trigger, a hardware based trigger, and the expiration of an internal timer.

18. The method of claim 10, further comprising:
receiving the data from an external configuration tool.

19. An apparatus, comprising:
a processing device to retrieve configuration data from a memory of a processing system; and
a system bus to load the configuration data into a configuration register, the configuration register comprising a plurality of programmable logic blocks to store the configuration data for a programmable logic function, wherein a first programmable logic block of the plurality of programmable logic blocks implements the programmable logic function based on the configuration data without interrupting an operation of another programmable logic function implemented by a second programmable logic block of the plurality of programmable logic blocks, wherein each unit of configuration data in the configuration register is individually addressable over the system bus, and wherein the plurality of programmable logic blocks are configured as a sum of products array.

20. The apparatus of claim 19, wherein the system bus comprises a built-in system bus to provide random access to the configuration register and an application register embedded in the programmable logic system by individually addressing each byte of data in the configuration register and the application register, wherein the built-in system bus is formed without using programmable logic resources.

* * * * *